INVENTORS
Harold N. Ipsen
Karl H. Seelandt
by Wolfe, Hubbard, Voit & Osann
ATTORNEYS INVENTORS
Harold N. Ipsen
Karl H. Seelandt
by Wolfe, Hubbard, Voit, & Osann
ATTORNEYS 3,019,809
COMBINED VACUUM VALVE AND COLD TRAP
Harold N. Ipsen and Karl H. Seelandt, Rockford, Ill., assignors to Ipsen Industries, Inc., Rockford, Ill., a corporation of Illinois
Filed Sept. 13, 1960, Ser. No. 55,458
7 Claims. (Cl. 137—340)

This invention relates to a system for evacuating a chamber such as the interior of a heat treating furnace and, more particularly, to a system which uses both a mechanical pump and an oil diffusion vapor pump. The latter, by issuing jet streams of oil vapor, impel the air molecules away from the chamber being evacuated and thereby aids the mechanical pump. In such a system, a cold trap is disposed ahead of the diffusion pump to condense oil vapor which may backstream and other vapors which may be in the chamber. Also interposed between the pumps and the chamber is a vacuum valve which is closed to maintain the vacuum in the chamber.

One object of the invention is to combine a vacuum valve and a cold trap in a novel manner so as to provide a comparatively simple and compact arrangement constructed as a unitary assembly.

Other objects and advantages of the invention will become apparent from the following detailed description taken in connection with the accompanying drawings, in which.

Figure 1:
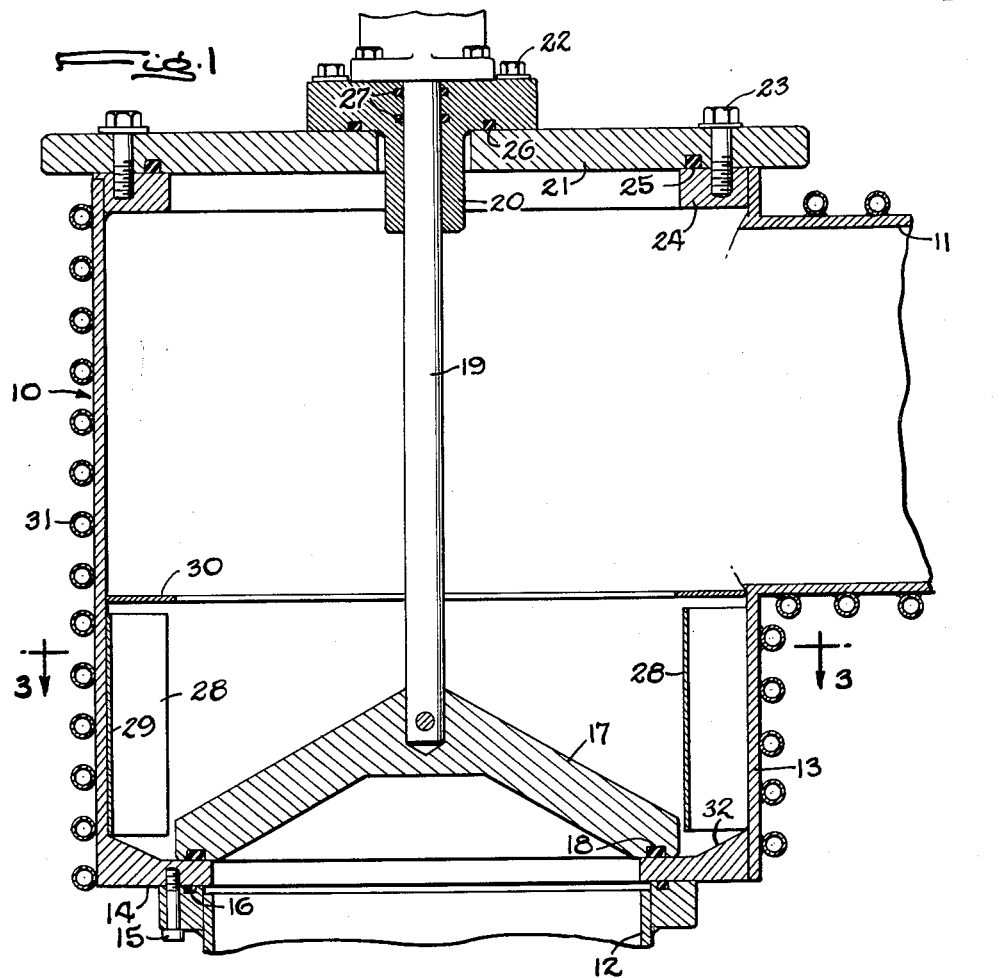
FIGURE 1 is a fragmentary sectional view taken along the axis of a combined vacuum valve and cold trap embodying the novel features of the present invention.

For purposes of illustration, the invention is shown in the drawings as embodied in a combined vacuum valve and cold trap which may be used in evacuating a chamber (not shown) such as the interior of a heat treating furnace and which includes a hollow body 10. Herein, the latter is L-shaped to provide an inlet portion 11 communicating with the chamber to be evacuated and an outlet portion 12 with the main or intermediate portion 13 between the inlet and outlet. The outlet is connected to a pumping apparatus (not shown) which conventionally includes both a mechanical pump and an oil diffusion vapor pump.

In vacuum systems such as this, it is necessary to have a valve which closes off the chamber after the evacuation is complete. Also, a so-called cold trap is placed between the diffusion pump and the chamber to prevent oil vapors from backstreaming into the chamber and to collect condensable vapors which may be present in the chamber.

The present invention contemplates a simplified construction in which the vacuum valve and the cold trap are combined into a unitary and compact assembly. For this purpose, the cold trap is arranged in a novel manner to surround the valve and to condense the oil vapors and other vapors as the air carrying them passes through the valve. Both the valve and the cold trap are disposed in the intermediate portion 13 of the body 10.

To achieve the foregoing, the intermediate portion 13 of the body is made larger than the outlet portion 12 to provide an annular shoulder 14 between the two. In the illustrated form of the invention, the shoulder is made as a flange integral with the lower end of the intermediate portion and the outlet 12, which is made separately, is secured to the underside of the flange by screws 15, the two parts being sealed by an O-ring 16. A valve disk 17 disposed within the intermediate portion 13 seats against the upper side of the flange 14 whereby the disk and the flange constitute the vacuum valve.

In the present instance, the valve disk is conically shaped with a recessed sealing ring 18 extending around its periphery to engage the shoulder 14. Supporting the disk for movement toward and away from the shoulder is a vertical rod 19 pinned at its lower end to the disk. The upper end of the rod projects through a bushing 20 which projects through a cover 21 and is fastened to the latter by screws 22. The cover closes the upper end of the body 10 and is secured in place by screws 23 which are threaded into an annular flange 24 extending around the interior of the body. Sealing rings 25, 26 and 27 seal the cover 21, the bushing 20 and the rod 19 respectively.

Figure 3:
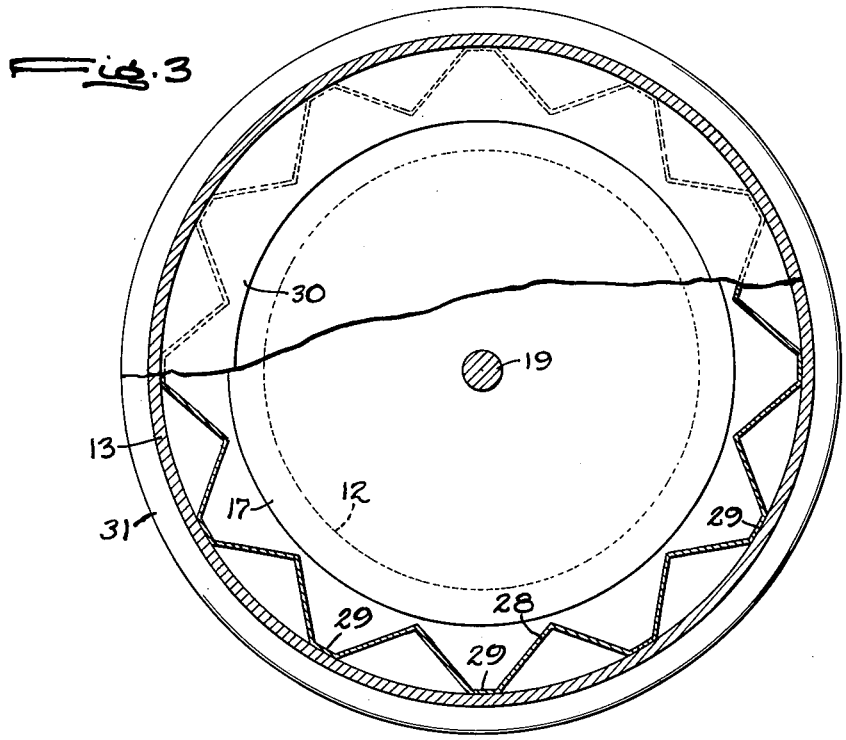
FIG. 3 is a sectional view taken along the line 3—3 in FIG. 1, parts being broken away and shown in section.

With the intermediate portion 13 of the body 10 being larger than the outlet portion 12, there is a space surrounding the valve disk 17. An annular baffle 28 is disposed in this space and provides surfaces on which the various vapors may condense. While the baffle may take various forms, herein it is a corrugated ring of sheet metal as illustrated most clearly in FIG. 3. Between corrugations, the baffle is flattened as indicated at 29 where it is welded or otherwise secured to the wall of the intermediate portion 13. The baffle is open at both ends so that air may flow both inside and outside the corrugations.

Figure 2:
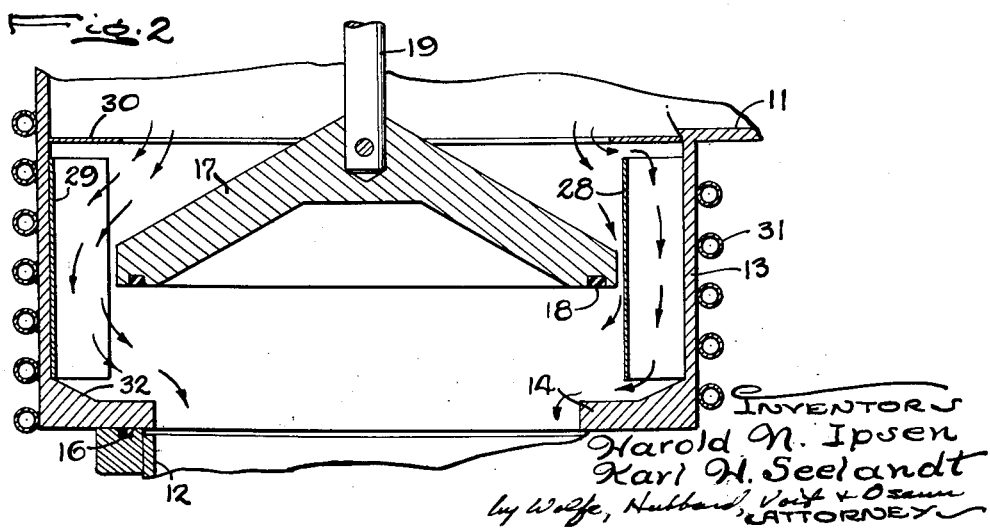
FIG. 2 is a view similar to FIG. 1 but shows the parts in a different position.
Figure 4:
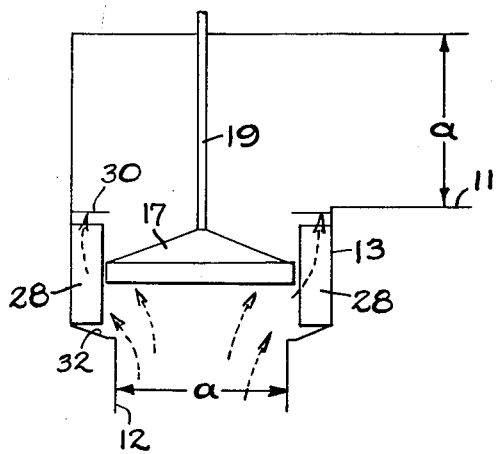
FIG. 4 is a schematic view of the combined vacuum valve and cold trap.

To insure that all vapors strike a surface upon which they may condense, a thin annulus 30 of sheet metal is secured to the intermediate portion 13 of the body 10 above the baffle 28 and forms a flange which projects in far enough to overlie the periphery of the valve disk 17. With this arrangement, the air and vapors being evacuated follow the circuitous path illustrated by the arrows in FIG. 2, that is, the vapors are deflected out toward the baffle and strike either the baffle or the shoulder 14. Similarly, any oil vapors which may backstream are deflected out to strike the baffle or the underside of the annulus 30 as illustrated by the arrows in FIG. 4.

Figure 5:
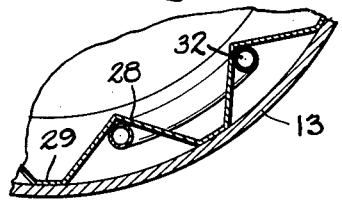
Fig. 5 is a fragmentary view of a modified form of the invention.

Means is provided to cool the body 10 and particularly the baffle 28, the annulus 30 and the shoulder 14 to reduce the temperature of these parts to a point below the dew point of the vapors which are likely to be encountered and thereby insure the condensation of all vapors which flow into the baffle. Herein, this means comprises a tube 31 wrapped around the body and carrying a cooling agent such as water or liquid nitrogen. If further cooling of the baffle 28 is required, an additional coil 32 may be disposed within the corrugations of the baffle as shown in FIG. 5. As the vapors condense, they run down the baffle, onto the shoulder 14 and into the outlet 12, the shoulder 14 being inclined slightly adjacent the wall of the body as indicated at 32 to prevent the condensates from collecting on the shoulder.

The various areas of the passages are correlated so as not to restrict the passage of air during the evacuating operation. Thus, the diameters $a$ (FIG. 4) of the inlet 11 and outlet 12 are the same to provide equal cross sectional areas. Also, the cross sectional area of the annular space around the valve disk 17 is substantially the same as the areas of the inlet and outlet.

It will be observed that the present invention provides both a vacuum valve and a cold trap in a unitary assembly. Both occupy substantially the same space and the overall construction is relatively simple as compared with prior arrangements in which the valve and the cold trap were made as separate elements.

We claim as our invention:

1. A combined cold trap and vacuum valve comprising a hollow body having a tubular inlet portion, a tubular outlet portion and a tubular intermediate portion disposed between said inlet and outlet portions, said intermediate portion being coaxial with said outlet portion and being larger in diameter than the outlet portion to provide an annular shoulder extending around the end of the outlet portion, a valve disk disposed within said intermediate portion to seat against said shoulder and having a diameter larger than the diameter of said outlet portion and smaller than the diameter of said intermediate portion, an annulus axially spaced from said shoulder and extending around said intermediate portion to overhang the periphery of said disk, means supporting said disk for movement toward and away from said shoulder, an annular baffle disposed between said shoulder and said annulus and disposed in the space surrounding said disk, and means for cooling said baffle, said shoulder and said annulus.

2. A combined cold trap and vacuum valve comprising a hollow body having a tubular inlet portion, a tubular outlet portion and a tubular intermediate portion disposed between said inlet and outlet portions, said intermediate portion being coaxial with said outlet portion and being larger in diameter than the outlet portion to provide an annular shoulder extending around the end of the outlet portion, a valve disk disposed within said intermediate portion to seat against said shoulder and having a diameter larger than the diameter of said outlet portion and smaller than the diameter of said intermediate portion, an annulus axially spaced from said shoulder and extending around said intermediate portion to overhang the periphery of said disk, means supporting said disk for movement toward and away from said shoulder, an annular baffle disposed between said shoulder and said annulus and disposed in the space surrounding said disk, the cross sectional areas of said inlet and outlet portions being substantially equal to each other and to the cross sectional area of the space surrounding said disk, and means for cooling said baffle, said shoulder and said annulus.

3. A combined cold trap and vacuum valve comprising a hollow body having a tubular inlet portion, a tubular outlet portion and a tubular intermediate portion disposed between said inlet and outlet portions, said intermediate portion being coaxial with said outlet portion and being larger in diameter than the outlet portion to provide an annular shoulder extending around the end of the outlet portion, a valve disk disposed within said intermediate portion to seat against said shoulder and having a diameter larger than the diameter of said outlet portion and smaller than the diameter of said intermediate portion, an annulus axially spaced from said shoulder and extending around said intermediate portion to overhang the periphery of said disk, means supporting said disk for movement toward and away from said shoulder, an annular baffle disposed between said shoulder and said annulus and disposed in the space surrounding said disk, said baffle being formed with a series of longitudinal corrugations, and means for cooling said baffle, said shoulder and said annulus.

4. A combined cold trap and vacuum valve comprising a hollow body having a tubular inlet portion, a tubular outlet portion and a tubular intermediate portion disposed between said inlet and outlet portions, said intermediate portion being coaxial with said outlet portion and being larger in cross sectional area than the outlet portion to provide a shoulder extending around the end of the outlet portion, a valve disk larger than said outlet portion and smaller than said intermediate portion and disposed within said intermediate portion to seat against said shoulder, means supporting said disk for movement toward and away from said shoulder, a flange extending around said intermediate portion and axially spaced from said shoulder, said flange projecting in over the periphery of said disk, a baffle disposed between said flange and said shoulder and encircling said disk, and means for cooling said baffle.

5. A combined cold trap and vacuum valve as defined in claim 4 in which said cooling means comprises a tube coiled around said intermediate portion and adapted to carry a cooling agent.

6. A combined cold trap and vacuum valve as defined in claim 4 in which said cooling means comprises a tube extending around and in contact with said baffle and adapted to carry a cooling agent.

7. A combined cold trap and vacuum valve as defined in claim 4 in which said baffle is formed with a series of longitudinal corrugations and in which said cooling means comprises a tube projecting through said corrugations and adapted to carry a cooling agent.

References Cited in the file of this patent

UNITED STATES PATENTS

| | | |
|---|---|---|
| 2,575,875 | Johnson | Nov. 20, 1951 |
| 2,646,065 | Tyson | July 21, 1953 |
| 2,852,035 | Holle | Sept. 16, 1958 |